(12) United States Patent
Knoll et al.

(10) Patent No.: US 9,090,768 B2
(45) Date of Patent: Jul. 28, 2015

(54) STYROL/BUTADIENE BLOCK COPOLYMER MIXTURES FOR SHRINK FILMS

(75) Inventors: Konrad Knoll, Mannheim (DE);
Helmut Steininger, Worms (DE);
Michael Schuster, Mannheim (DE);
Daniel Wagner, Bad Dürkheim (DE);
Peter Merkel, Kapellen (BE)

(73) Assignee: Styrolution Europe GmbH (DE)

(*) Notice: Subject to any disclaimer, the term of this patent is extended or adjusted under 35 U.S.C. 154(b) by 1082 days.

(21) Appl. No.: 11/813,742

(22) PCT Filed: Dec. 31, 2005

(86) PCT No.: PCT/EP2005/014166
§ 371 (c)(1),
(2), (4) Date: Jul. 11, 2007

(87) PCT Pub. No.: WO2006/074819
PCT Pub. Date: Jul. 20, 2006

(65) Prior Publication Data
US 2008/0269414 A1    Oct. 30, 2008

(30) Foreign Application Priority Data
Jan. 12, 2005  (DE) .......................... 10 2005 001 637

(51) Int. Cl.
*C08L 53/02*    (2006.01)

(52) U.S. Cl.
CPC ...................... *C08L 53/02* (2013.01)

(58) Field of Classification Search
CPC .............................. C08L 53/02; C08L 2666/24
USPC ........... 525/89, 271, 314, 315, 316; 428/36.9, 428/116; 524/505
See application file for complete search history.

(56) References Cited

U.S. PATENT DOCUMENTS

2004/0241484 A1* 12/2004 Uchida et al. ................. 428/522
2005/0222331 A1* 10/2005 Hoshi et al. ..................... 525/88

FOREIGN PATENT DOCUMENTS

WO    WO 03/091303    * 11/2003

OTHER PUBLICATIONS

Brandrup et al. The Polymer Handbook 4th Edition 1999.*
International Preliminary Report on Patentability (Chapter II of the PCT) for International Application No. PCT/EP2005/014166. (7 pages).

* cited by examiner

*Primary Examiner* — Mark Kaucher
(74) *Attorney, Agent, or Firm* — Drinker Biddle & Reath LLP

(57) ABSTRACT

A mixture which comprises from 5 to 50% by weight of a block copolymer A, which comprises one or more copolymer blocks $(B/S)_A$ each composed of from 65 to 95% by weight of vinylaromatic monomers and from 35 to 5% by weight of dienes and of a glass transition temperature $Tg_A$ in the range from 40° to 90° C.; from 95 to 50% by weight of a block copolymer B, which comprises at least one hard block S composed of vinylaromatic monomers and comprises one or more copolymer blocks $(B/S)_B$ each composed of from 20 to 60% by weight of vinylaromatic monomers and from 80 to 40% by weight of dienes and of a glass transition temperature $Tg_B$ in the range from −70° to 0° C.; from 0 to 45% by weight of polystyrene or of a block copolymer C other than A and B; and from 0 to 6% by weight of a plasticizer; and its use for production of shrink films.

11 Claims, No Drawings

STYROL/BUTADIENE BLOCK COPOLYMER MIXTURES FOR SHRINK FILMS

CROSS REFERENCE TO RELATED APPLICATIONS

This application is a National Phase filing under 35 U.S.C. §371 of PCT/EP2005/014166 filed Dec. 31, 2005, which claims priority to German Patent Application No. 102005001637.5, filed Jan. 12, 2005. The entire contents of each of the above-applications are incorporated herein by reference.

The invention relates to a mixture which comprises
 a) from 5 to 50% by weight of a block copolymer A which comprises one or more copolymer blocks $(B/S)_A$ each composed of from 65 to 95% by weight of vinylaromatic monomers and from 35 to 5% by weight of dienes and of a glass transition temperature $Tg_A$ in the range from 40° to 90° C.,
 b) from 95 to 50% by weight of a block copolymer B which comprises at least one hard block S composed of vinylaromatic monomers and comprises one or more copolymer blocks $(B/S)_B$ each composed of from 20 to 60% by weight of vinylaromatic monomers and from 80 to 40% by weight of dienes and of a glass transition temperature $Tg_B$ in the range from −70° to 0° C.,
 c) from 0 to 45% by weight of polystyrene or of a block copolymer C other than A and B, and
 d) from 0 to 6% by weight of a plasticizer,
and its use for production of shrink films.

The use of styrene-butadiene block copolymers as heat-shrinkable films has been disclosed by way of example in EP-A 058 952 or EP-A 436 225. The films are stretched to over 500% by healing at from 60 to 100° C., and the stretched state is set after cooling to room temperature. After processing to give pods, these can be printed and by way of example placed over a bottle and reshrunk in a heat tunnel at from about 70 to 90° C., whereupon the film clings to the bottle.

Shrink films are intended to shrink almost to their initial dimensions when applied under hot conditions, but at the same time are intended to have high storage stability, meaning that they are intended to exhibit no shrinkage at temperatures around 20-30° C. Furthermore, they are intended not only to have high transparency but also to have high stiffness and strength.

EP-A 852240 describes styrene-butadiene block copolymers which after orientation in hot conditions, are claimed to have reduced level of spontaneous shrinkage at 30° C.

It was an object or the invention to find styrene-butadiene block copolymers which can be processed to give storage-stable, heat-shrinkable films with high shrinkage capability and high stiffness/strength. A further intention was that the films should have high transparency, even after stretching and shrinking.

Accordingly, the abovementioned mixture composed of block polymers has been found.

The mixture preferably comprises from 20 to 40% by weight of the block copolymer A, from 80 to 60% by weight of the block copolymer B, and from 0 to 20% by weight of polystyrene or of a block copolymer C other than A and B. Besides the block copolymers A, B and, if appropriate, C, the mixture may also comprise relatively small amounts of other thermoplastic polymers and from 1 to 6% by weight of conventional auxiliaries, such as plasticizsrs. Ptasticizers which may be used are from 0 to 6% by weight, preferably from 2 to 4% by weight, of a homogeneously miscible oil or oil mixture, in particular white oil or dioctyl adipate, or a mixture of these. Particularly good shrink values are obtained when the white oil content of the mixture is from 2.5 to 3.5% by weight, based on the mixture.

Block Copolymer A

The mixture comprises from 5 to 50% by weight of a block copolymer A which comprises one or more copolymer blocks $(B/S)_A$ each composed of from 65 to 95% by weight of vinylaromatic monomers and of from 35 to 5% by weight of dienes and with a glass transition temperature $Tg_A$ in the range from 40° to 90° C.

The glass transition temperature of the copolymer block $(B/S)_A$ is preferably in the range from 50 to 70° C. The glass transition temperature is affected by the comonomer constitution and can be determined via differential scanning calorimetrie (DSC) or differential thermal analysis (DTA), or calculated from the Fox equation. The copolymer block $(B/S)_A$ is preferably composed of from 80 to 90% by weight of styrene and from 10 to 20% by weight of butadiene.

Preference is given to block copolymers A which comprise one or more copolymer blocks $(B/S)_A$ composed of vinylaromatic monomers and of dienes with random distribution. By way of example, these may be obtained via anionic polymerization using alkyllithium compounds in the presence of randomizers, such as tetrahydrofuran or potassium salts. It is preferable to use potassium sells with a ratio of anionic initiator to potassium salt in the range from 25:1 to 60:1. This can simultaneously achieve a low proportion of 1,2 linkages of the butadiene units.

The proportion of 1,2 linkages of the butadiene units is preferably in the range from 8 to 15%, based on the entirety of the 1,2,1,4-cis, and 1,4-trans linkages.

It is particularly preferable that the block copolymer A is composed of a single copolymer block $(B/S)_A$ or has linear structures, such as $S-(B/S)_A$ or $S-(B/S)_A-S$, where in each case S is a hard block composed of vlnylaromatic monomers. Preference is likewise gwen to star polymers $[(B/S)_A]_n$ having n star branches, these being obtainable via coupling using an n-functional coupling agent or via initiation using an n-functional initiator. An example of a suitable coupling agent is epoxidized vegetable oil, such as epoxidized linseed or soybean oil. In this instance the product is stars having from 3 to 5 branches. Star block copolymers $[S-(B/S)_A]_n$ are likewise preferred.

However, random polymers $(B/S)_A$ can also be prepared via free-radical polymerization.

The weight-average molar mass $M_w$ of the copolymer block $(B/S)_A$ is generally in the range from 50 000 to 400 000 g/mol, preferably in the range from 60 000 to 200 000 g/mol, particularly preferably in the range from 100 000 to 160 000 g/mol. For the structures, such as $S-(B/S)_A$ or $S-(B/S)_A-S$, the weight-averags molar mass $M_w$ for each block S is preferably in the range from 15 000 to 45 000 g/mol. The blocks S are preferably composed of styrene units. Control of the molecular weight of the anionically prepared polymers takes place by way of the ratio of amount of monomer to amount of initiator. However, initiator can also be added repeatedly after monomer feed has taken place, the result then being bi- or multimodal distribution. For polymers prepared by a free-radical route, $M_w$ is adjusted by way of the polymerization temperature and/or addition of regulators.

Block Copolymer B

The inventive mixture comprises, as block copolymer B, from 95 to 50% by weight of a block copolymer B which comprises at least one hard block S composed of vinylaromatic monomers and comprises one or more copolymers blocks (B/S)$_B$ each composed of from 20 to 60% by weight of vinylaromatic monomers and of from 80 to 40% by weight of dienes and of a glass transition temperature Tg$_B$ in the range from −70° to 0° C., preferably in the range from −65° C. to −20° C.

Particularly suitable block copolymers B are rigid block copolymers which are composed of from 60 to 90% by weight of vinylaromatic monomers and of from 10 to 40% by weight of diene, based on the entire block copolymer, and are mainly composed of hard blocks S comprising vinylaromatic monomers, in particular polystyrene, and of soft blocks B or B/S comprising dienes, such as butadiene and isoprene. Block copolymers with from 70 to 80% by weight of styrene and from 20 to 30% by weight of diene are particularly preferred.

The copolymer blocks (B/S)$_B$ of the block copolymer B preferably have random distribution of the vinylaromatic monomers and dienes.

Preferred block copolymers B have a star-shaped structure having at least two terminal hard blocks S$_1$ and S$_2$ with different molecular weight composed of vinylaromatic monomers, the proportion of the entirety of the hard blocks S being at least 40% by weight, based on the entire block copolymer B. Linear structures, such as (B/S)$_B$-S$_2$ or S$_1$-(B/S)$_B$-S$_2$, are also possible. The number-average molar mass M$_n$ of the terminal blocks S$_1$ is preferably in the range from 5000 to 30 000 g/mol, and the number-average molar mass M$_n$ of S$_2$ is preferably in the range from 35 000 to 150 000 g/mol.

Preference is given to polymodale styrene-butadiene block copolymers having terminal styrene blocks, for example those described in DE-A 25 50 227 or EP-A 0 654 488.

Particular preference is given to block copolymers B having at least two hard blocks S$_1$ and S$_2$ composed of vinylaromatic monomers and having at least one random soft block (B/S)$_B$ situated between these and composed of vinylaromatic monomers and of dienes, the proportion of the hard blocks being above 40% by weight, based on the entire block copolymer, and the 1,2-vinyl content in the soft block B/S being below 20%, such as those described in WO 00/58380.

The inventive mixtures are highly transparent and are particularly suitable for production of shrink films. They are stable in storage and exhibit no significant shrinkage at from 40° C. to 50° C. In the range from 90 to 100° C., the degree of shrinkage is high, and this permits flexible matching to process conditions, and also permits encapsulation of very bulbous shapes.

EXAMPLES

Block Copolymer A

To prepare the linear styrene-butadiene block copolymers A2 to A10 having B/S structure, cyclohexane was used as initial charge and was titrated to the end point at 80° C. with sec-butyllithium (BuLl), in each case using 1.6 ml, and was then treated with the amounts mentioned in Table 1 of sec-butyllithium for initiation and potassium tert-amyl alcoholate (PTA) as randomizer, and the mixture was cooled to 40° C. The polymerization was carried out in two portions. In each case, half of the amounts of styrene and butadiene stated in Table 1 were added simultaneously, and the maximum temperature was restricted to 75° C. via countercoollng. The living polymer chains were then terminated via addition of isopropanol, the mixture was acidified with CO$_2$/water, and a stabilizer solution was added. Cyclohexane was evaporated in a vacuum drying cabinet.

To prepare the linear styrene-butadiene block copolymer A1 having the structure S-(B/S)-S, the monomers were added in three portions, and in each case prior to and after the joint styrene-butadiene additions for polymerization of the middle (S/B) block here, 400 g of styrene were added and polymerized to completion to form the terminal styrene blocks. The procedure was otherwise as for preparation of the block copolymers A2 to A10, corresponding to the data in Table 1.

Starting materials, structure, and molecular weights of block copolymers A1 to A10 are given in Table 1.

TABLE 1

| | Structure | Tg [° C.] | Cyclohexane [ml] | sec-BuLi 1.4 M [ml] | PTA 0.1175 M [ml] | Styrene [g] | Butadiene [g] | Isopropanol [mL] | Mn (GPC) | Mw (GPC) |
|---|---|---|---|---|---|---|---|---|---|---|
| A1 | S-S/B-S | 50 | 4786 | 8.79 | 3.02 | 400 (S) 664 (S/B) 400 (S) | 136 (SB) | 1.41 | 122 000 | 146 000 |
| A2 | S/B | 70 | 4786 | 19.05 | 6.55 | 1440 | 160 | 3.06 | 63 000 | 71 000 |
| A3 | S/B | 70 | 2991 | 7.14 | 2.53 | 900 | 100 | 1.15 | 97 000 | 108 000 |
| A4 | S/B | 70 | 2991 | 5.1 | 1.81 | 900 | 100 | 0.82 | 130 000 | 149 000 |
| A5 | S/B | 70 | 2991 | 4.46 | 1.58 | 900 | 100 | 0.72 | 154 000 | 163 000 |
| A6 | S/B | 60 | 2991 | 7.14 | 2.53 | 870 | 130 | 1.15 | 111 000 | 122 000 |
| A7 | S/B | 50 | 2991 | 7.14 | 2.53 | 792 | 171 | 1.15 | 130 000 | 141 000 |
| A8 | S/B | 60 | 2991 | 11.9 | 4.73 | 870 | 130 | 1.91 | 59 000 | 64 000 |
| A9 | S/B | 60 | 2991 | 5.95 | 2.36 | 870 | 130 | 0.96 | 119 000 | 131 000 |
| A10 | S/B | 60 | 2991 | 5.1 | 1.81 | 870 | 130 | 0.82 | 143 000 | 155 000 |

Block Copolymer B

A star-shaped block copolymer B1 (26% by weight of butadiene, 74% by weight of styrene) having random copolymer blocks B/S was prepared via sequential anionic polymerization of styrene and butadiene, followed by coupling using epoxidized linseed oil as in Example 15 of WO 00/58380.

The block copolymer mixtures B2 were prepared in accordance with the data in Table 2 via sequential anionic polymerization using double initiator feed (sec-butyllithium BuLi) in stage 1 or 2 at solids content of about 30% by weight in cyclohexane at temperatures in the range from 50 to 80° C. Once the polymerization had ended, isopropanol was used for termination and CO$_2$/water for acidification. The polymerization was carried out in the presence of potassium tert-amyl alcoholate (PTA) at a molar lithium/potasslum ratio of 38/1, in order to obtain a random S/B copolymer block. The block copolymers were freed from solvent in a 16 mm vented extruder.

The resultant block copolymer mixtures comprise block copolymers having random copolymer blocks of the structure (I) $S_1$-$(B/S)_1$-$(B/S)_1$-$S_2$ with number-average molar mass of about 150 000 g/mol and having the structure (II) $(B/S)_1$-$(B/S)_2$-$S_3$ with a number-average molar mass of about 75 000 g/mol in a molar ratio (I)/(II) corresponding to the initiator ratio $I_1/I_2$.

TABLE 2

| Stage | Feed | 2 |
|---|---|---|
| 1 | sec-BuLi [mol] | 25.65 |
|  | Styrene [kg] | 1950 |
|  | PTA [mol] | 1.012 |
| 2a | sec-BuLi [mol] | 12.82 |
|  | Butadiene/styrene [kg] | 565/785 |
| 2b | Butadiene/styrene [kg] | 685/415 |
| 3 | Styrene | 600 |
|  | $I_1/I_2$ | 2/1 |

Component C

Standard polystyrene PS 158 K with $M_w$ of 270 000 and $M_n$ of 103 000 from BASF Aktiengesellschaft was used as component C.

Component D

Medicinal white oil with viscosity of 70 centistokes at 40° C. was used as component D1, and dioctyl adipata (Plastomoll DOA from BASF Aktiengesellschafft was used as component D2.

Mixtures M1-M22

Each of the block copolymer mixtures was prepared in an extruder via melting of the parts by weight stated in Table 5 of the block copolymers A1-A10 and B1 and, respectively, B2 (for M12), and also of components C (polystyrene PS 158 K) and D (white oil, and also dioctyl adipate in the case of mixtures M9-M11), and were then pressed to give films.

Comparative experiments c1 to c8

Each of the mixtures was prepared in an extruder via melting of the parts by weight stated in Table 5 of block copolymers B1 and, respectively B2 (for c5), and also of components C and D, and were then pressed to give films. They comprise no block copolymers A.

Values for mechanical properties, such as modulus of elasticity, tensile stress, and tensile strain, were determined to ISO 527 and are stated in Table 3.

The films were cut into strips of length 8 cm and width 1 cm, and stretched in a tensile machine at 80° C. almost to the tensile strain at break determined in the preliminary experiment, and were cooled to 23° C. in the stretched state. The shrink values were determined as in Table 4 after 10 sec in a waterbath at 90° C. Complete shrink curves were also determined as in Table 6. For this, the film was stretched using a uniform degree of stretching of 4.5 (3.5 in the case of c5), and shrinkage S was then determined at 10 degree intervals.

TABLE 3

| Mixture | Modulus of elasticity [N/mm$^2$] | Tensile stress [N/mm$^2$] at. | | | Tensile strain [%] at | | |
|---|---|---|---|---|---|---|---|
|  |  | YS | TSmax | TSB | YS | TSmax | TSB |
| M1 | 774 | 14.1 | 25.3 | 25.3 | 4.8 | 325 | 325 |
| M2 | 802 | 17.6 | 23.4 | 25.3 | 4.3 | 271 | 272 |

YS = yield stress:

TSmax = maximum tensile stress;

TSB = tensile stress at break

TABLE 4

| Mixture | Degree of stretching | | Shrinkage (at 90° C.) | |
|---|---|---|---|---|
|  | Max. | After shrinkage | Max | For degree of stretching = 4.5 |
| M3 | 6.1 | 2.1 | 65 | 58 |
| M4 | 5.3 | 2.1 | 60 | 57 |
| M5 | 5.0 | 2.2 | 55 | 54 |
| M6 | 5.3 | 2.1 | 61 | 80 |
| M7 | 5.9 | 2.7 | 55 | 50 |

TABLE 5

Constitution of mixtures and their shrink performance

| Mixture | Block copolymer A | Parts of A | Parts of B1 | Parts of B2 | Parts of C | Parts of D1 | Parts of D2 | S (40° C.) | S (50° C.) | S (60° C.) | S (70° C.) | S (80° C.) | S (90° C.) | S (100° C.) |
|---|---|---|---|---|---|---|---|---|---|---|---|---|---|---|
| M1 | A1 | 29.25 | 67.71 |  |  | 3.04 |  | 1% | 1% | 6% | 18% | 39% | 59% | 70% |
| M2 | A2 | 29.25 | 67.71 |  |  | 3.04 |  | 0% | 0% | 3% | 16% | 36% | 56% | 65% |
| M3 | A3 | 29.25 | 67.71 |  |  | 3.04 |  | 0% | 0% | 2% | 11% | 34% | 58% | 68% |
| M4 | A4 | 29.25 | 67.71 |  |  | 3.04 |  | 0% | 0% | 2% | 14% | 36% | 57% | 68% |
| M5 | A5 | 29.25 | 67.71 |  |  | 3.04 |  | 0% | 1% | 7% | 20% | 37% | 54% | 66% |
| M6 | A6 | 29.25 | 67.71 |  |  | 3.04 |  | 0% | 0% | 4% | 19% | 41% | 60% | 69% |
| M7 | A7 | 29.25 | 67.71 |  |  | 3.04 |  | 0% | 1% | 8% | 19% | 34% | 50% | 60% |
| M8 | A6 | 30 | 68.45 |  |  | 1.55 |  | 0% | 0% | 5% | 21% | 41% | 59% | 68% |
| M9 | A6 | 29.25 | 67.71 |  |  | 1.54 | 1.5 | 0% | 0% | 4% | 19% | 41% | 59% | 68% |
| M10 | A6 | 29 | 67.47 |  |  | 1.53 | 2 | 0% | 0% | 3% | 18% | 41% | 59% | 69% |
| M11 | A6 | 23.75 | 67.22 |  |  | 1.53 | 2.5 | 0% | 1% | 5% | 19% | 41% | 58% | 65% |
| M12 | A6 | 29.25 |  | 67.71 |  | 3.04 |  | 0% | 1% | 7% | 22% | 45% | 59% | 66% |
| M13 | A2 | 27 | 61.60 |  | 9.48 | 3.27 |  | 1% | 1% | 2% | 11% | 31% | 54% | 67% |
| M14 | A2 | 24 | 54.76 |  | 18.96 | 3.49 |  | 1% | 0% | 2% | 10% | 30% | 50% | 65% |
| M15 | A2 | 21 | 47.91 |  | 28.44 | 3.70 |  | 0% | 0% | 2% | 10% | 24% | 45% | 63% |
| M16 | A2 | 18 | 41.07 |  | 37.92 | 3.92 |  | 2% | 1% | 3% | 9% | 20% | 40% | 61% |

TABLE 5-continued

Constitution of mixtures and their shrink performance

| Mixture | Block copolymer A | Parts of A | Parts of B1 | Parts of B2 | Parts of C | Parts of D1 | Parts of D2 | S (40° C.) | S (50° C.) | S (60° C.) | S (70° C.) | S (80° C.) | S (90° C.) | S (100° C.) |
|---|---|---|---|---|---|---|---|---|---|---|---|---|---|---|
| M17 | A8/A9 (1:2) | 29 | 67.96 | | | 3.04 | | 0% | 1% | 5% | 20% | 39% | 56% | 65% |
| M18 | A8/A9 (1:1) | 29 | 67.96 | | | 3.04 | | 0% | 1% | 5% | 18% | 38% | 57% | 65% |
| M19 | A8/A9 (2:1) | 29 | 67.96 | | | 3.04 | | 0% | 0% | 4% | 18% | 37% | 57% | 66% |
| M20 | A8/A10 (1:2) | 29 | 67.96 | | | 3.04 | | 0% | 1% | 9% | 24% | 42% | 61% | 68% |
| M21 | A8/A10 (1:1) | 29 | 67.96 | | | 3.04 | | 0% | 1% | 8% | 21% | 41% | 61% | 68% |
| M22 | A8/A10 (2:1) | 29 | 67.96 | | | 3.04 | | 0% | 1% | 7% | 20% | 39% | 55% | 63% |
| c1 | | | 97.78 | | | 2.22 | | 5% | 5% | 12% | 26% | 41% | 55% | 66% |
| c2 | | | 88.00 | | 9.48 | 2.52 | | 6% | 6% | 13% | 25% | 39% | 54% | 65% |
| c3 | | | 78.22 | | 18.96 | 2.82 | | 9% | 10% | 15% | 31% | 37% | 51% | 62% |
| c4 | | | 68.45 | | 28.44 | 3.12 | | 0% | 6% | 12% | 23% | 37% | 51% | 63% |
| c5 | | | | 68.45 | 28.44 | 3.12 | | 1% | 2% | 8% | 18% | 30% | 42% | 51% |
| c6 | | | 58.67 | | 37.92 | 3.42 | | 7% | 6% | 9% | 18% | 30% | 44% | 56% |

The invention claimed is:

1. A mixture comprising:
    a) from 5 to 50% by weight of a copolymer A which consists of one or more copolymer blocks $(B/S)_A$ in randomized form each composed of from 80 to 90% by weight of vinylaromatic monomers and from 10 to 20% by weight of dienes and of a glass transition temperature $Tg_A$ in the range from 40° to 90° C.;
    b) from 95 to 50% by weight of a block copolymer B which comprises at least one hard block S composed of vinylaromatic monomers and comprises one or more copolymer blocks $(B/S)_B$ each composed of from 20 to 60% by weight of vinylaromatic monomers and from 80 to 40% by weight of dienes and of a glass transition temperature $Tg_B$ in the range from −70° to 0° C.;
    c) from 0 to 45% by weight of polystyrene or of a block copolymer C other than A and B; and
    d) from 0 to 6% by weight of a plasticizer;
    wherein the copolymer blocks $(B/S)_A$ and $(B/S)_B$ of the copolymers A and B have random distribution of the vinylaromatic monomers and dienes.

2. The mixture according to claim 1, which comprises:
    a) from 20 to 40% by weight of the copolymer A;
    b) from 80 to 60% by weight of the block copolymer B; and
    c) from 0 to 20% by weight of polystyrene or of a block copolymer C other than A and B.

3. The mixture according to claim 1, wherein the copolymer block $(B/S)_A$ of the copolymer A has a number-average molar mass $M_n$ in the range from 50 000 to 150 000 g/mol.

4. The mixture according to claim 1, wherein the copolymer block (B/S)A of the copolymer A has a glass transition temperature in the range from 50° to 70° C.

5. The mixture according to claim 1, wherein the block copolymer B has a star-shaped structure having at least two terminal hard blocks $S_1$ and $S_2$ with different molecular weight composed of vinylaromatic monomers, and the proportion of the entirety of the hard blocks S is at least 40% by weight, based on the entire star-shaped block copolymer B.

6. The mixture according to claim 5, wherein the star-shaped block copolymer B has terminal blocks $S_1$ with a number-average molar mass $M_n$ in the range from 5000 to 30 000 g/mol and $S_2$ with a number-average molar mass $M_n$ in the range from 35 000 to 150 000 g/mol.

7. A shrink film, produced from a mixture according to claim 1.

8. The mixture according to claim 2, wherein the copolymer block $(BIS)_A$ of the copolymer A has a number-average molar mass $M_n$ in the range from 50 000 to 150 000 g/mol.

9. The mixture according to claim 2, wherein the copolymer block $(B/S)_A$ of the copolymer A has a glass transition temperature in the range from 50° to 70° C.

10. The mixture according to claim 3, wherein the copolymer block $(B/S)_A$ of the copolymer A has a glass transition temperature in the range from 50° to 70° C.

11. The mixture according to claim 1, wherein the copolymer A consists of a single copolymer block $(B/S)_A$.

* * * * *